United States Patent
Saunders et al.

(10) Patent No.: US 11,620,120 B1
(45) Date of Patent: Apr. 4, 2023

(54) CONFIGURATION OF SECONDARY PROCESSORS

(71) Applicant: Amazon Technologies, Inc., Seattle, WA (US)

(72) Inventors: Jonathan Paul Saunders, Austin, TX (US); Brian Robert Silver, Austin, TX (US); Thomas Sarvey, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 11 days.

(21) Appl. No.: 17/448,919

(22) Filed: Sep. 27, 2021

(51) Int. Cl.
G06F 9/44 (2018.01)
G06F 8/41 (2018.01)
G06F 8/54 (2018.01)
G06N 3/02 (2006.01)
G06F 1/04 (2006.01)
G06F 8/654 (2018.01)

(52) U.S. Cl.
CPC ............... *G06F 8/441* (2013.01); *G06F 1/04* (2013.01); *G06F 8/54* (2013.01); *G06F 8/654* (2018.02); *G06N 3/02* (2013.01)

(58) Field of Classification Search
None
See application file for complete search history.

(56) References Cited

U.S. PATENT DOCUMENTS

| 10,387,584 | B1 * | 8/2019 | Popovici | G06F 8/34 |
| 2008/0092073 | A1 * | 4/2008 | Shih | G06F 8/34 717/109 |
| 2021/0263715 | A1 * | 8/2021 | Shigemori | G06F 8/76 |
| 2022/0012033 | A1 * | 1/2022 | Park | G06F 8/65 |

* cited by examiner

*Primary Examiner* — Qamrun Nahar
(74) *Attorney, Agent, or Firm* — Weaver Austin Villeneuve & Sampson LLP (57) ABSTRACT

Systems and methods are provided for configuration of a secondary processor by a host processor. The host processor can access compiled firmware for the secondary processor, which has a parameter stored at a pre-determined address. The host processor can modify the parameter at the pre-determined address in the firmware to generate a modified firmware for the secondary processor. The host processor can further load the modified firmware into a memory of the secondary processor. The secondary processor can execute the modified firmware having the modified parameter. The host processor can further remodify the parameter in the memory of the secondary processor during runtime without having to recompile the firmware.

22 Claims, 7 Drawing Sheets

CONFIGURATION OF SECONDARY PROCESSORS

BACKGROUND

A computer system may include multiple secondary processors (SPs) to handle a variety of tasks. In some examples, the tasks may include implementing workarounds for hardware bugs or unexpected system behavior. The SPs can be part of an integrated circuit device, and can be configured by an off-chip processor.

BRIEF DESCRIPTION OF THE DRAWINGS

Various embodiments in accordance with the present disclosure will be described with reference to the drawings, in which.

DETAILED DESCRIPTION

A computer system may include a host processor (e.g., a CPU) coupled to an integrated circuit device (e.g., a system-on-a-chip (SoC)) configured to perform certain functionality. The computer system can be used to provide services such as analytics, cloud computing, deployment services, storage, databases, application development, or web services, among others. As an example, the SoC can be an accelerator engine, which can be used to accelerate certain operations or computations performed by the computer system. In some computer systems, the host processor may rely on a plurality of secondary processors (SPs) in the SoC for a variety of foreseen and unforeseen tasks. The SPs can be general-purpose or application-specific processors, which can be configured to execute firmware to perform specific tasks. The firmware may store different parameters which can be used by the SPs for execution of these tasks.

In some examples, the tasks may include implementing hardware workarounds for unexpected system behavior, or for avoiding a system crash or a hang. For example, in some cases, the SoC may be waiting for a certain signal to arrive or an event to take place before performing an operation. An SP may be used to avoid a system hang in case the expected event takes too long, or doesn't take place. Thus, the SPs may often have to wait for specific durations of time for various events to take place. In order to convert the clock cycles to a wall clock time, an SP may need to determine the runtime clock frequency. However, in some instances, the clock frequency may change during runtime (e.g., change in the application executing on the SoC, power saving mode).

In some cases, the firmware (binary code or binary) may be compiled from source code for the SP written in a programming language such as C++. In such cases, a hard-coded constant or a parameter can be used to define the clock frequency when compiling; however, the firmware may need to be recompiled when the clock frequency changes. Additionally, during runtime, multiple SPs may be running at different clock frequencies, which would require different binaries to be compiled with respective clock frequencies. In some implementations, source code for these SPs may not be readily accessible, and therefore the binaries cannot be compiled on the fly. In some cases, additional addresses (e.g., memory mapped registers) can be built into the hardware to store the clock frequency; however, the additional hardware may need to be planned out in advance, and would limit the configurability as the need for additional configuration values arises.

In some embodiments, a set of parameters can be stored at a certain location in the firmware for the SPs, which can be shared with the host processor. The host processor can configure the SPs by modifying the parameters at that location in the firmware before loading the firmware into the respective SP memories. A compiler (or a linker) can place the set of parameters in that location when compiling the code for the SPs to generate the firmware. In some embodiments, the location can be shared with the host processor via exported headers from the compiler. The software running on the host processor can determine the addresses for different parameters based on the exported headers and the base address of the SP memory, and can modify the parameters accordingly. The SPs can execute the firmware with the modified parameters without the firmware having to be re-compiled with the modified parameters.

In various embodiments, the parameters can be modified during the boot process of the system when bringing-up the SPs, or during runtime. For example, the host processor may determine during runtime that a parameter needs to be modified. As an example, a parameter from the set of parameters can be used to specify a clock frequency for an SP, which may change during runtime. Certain embodiments can allow the host processor to remodify the clock frequency parameter in the SP memory during runtime using the pre-determined address, when there is a change in the runtime clock frequency.

In some embodiments, an SP may need to be reset during runtime, e.g., due to a software change or a system error. Certain embodiments can allow re-configuring the SP by modifying the parameters at the pre-determined addresses, and reloading the firmware into the SP memory without having to recompile the firmware. In some embodiments, a single binary can be modified with different parameter values for different SPs. For example, the clock frequency parameter can have different values for different SPs.

Thus, the techniques disclosed herein can be used to change the configuration of the SPs when the firmware is loaded into the SP memory, or during runtime, without having to recompile the firmware. The parameters can be stored in the SP memories without the need for additional hardware to be implemented in the SP. The SPs can read the parameters from their memories just like other data stored in the memory. The memory may include a data region to store data and/or an instruction region to store instructions for the SP, and the parameters can be stored in either region.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the embodiments being described.

Figure 1:
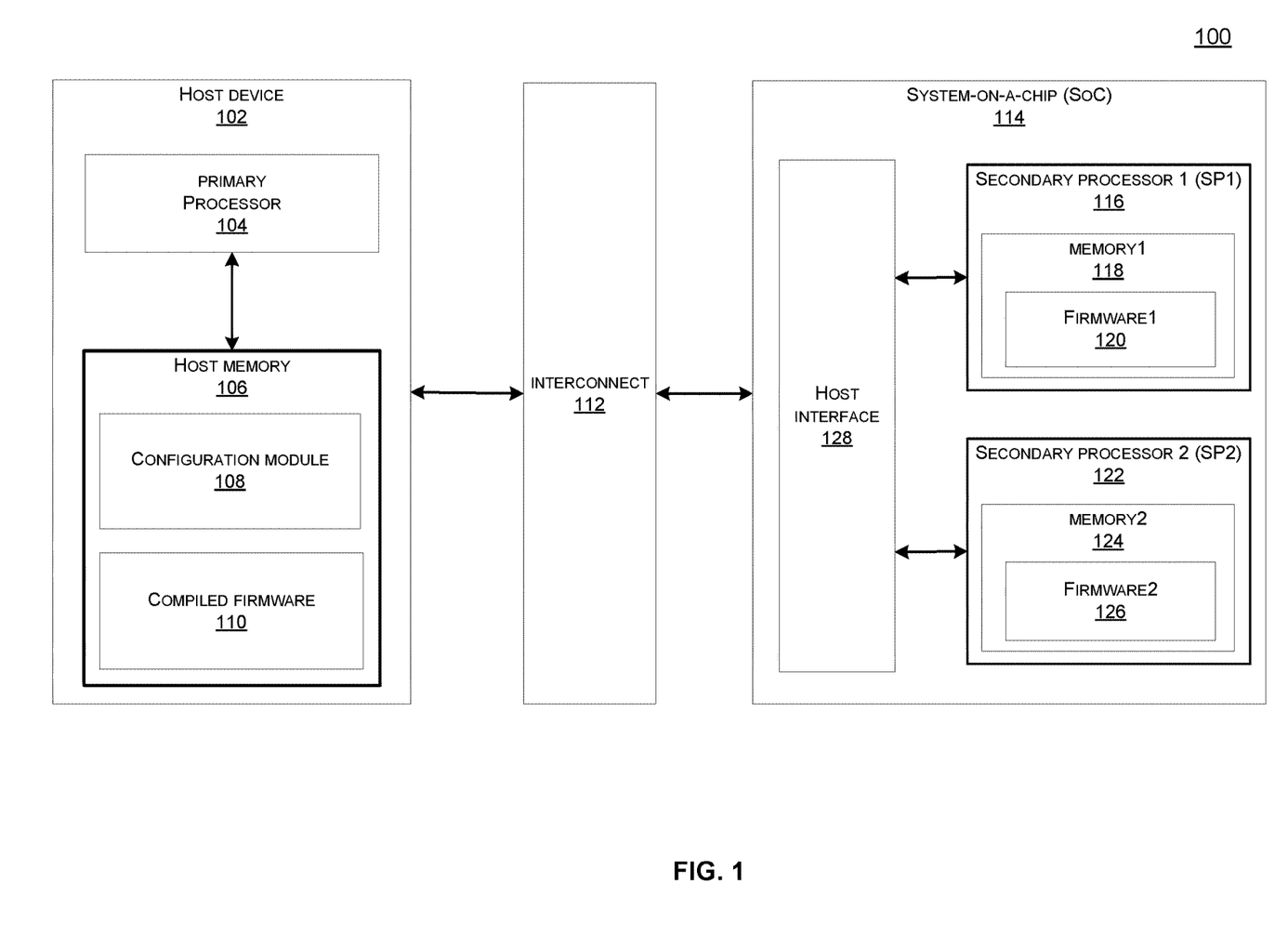
FIG. 1 illustrates a system comprising a host device that can be used to configure secondary processors (SPs) on a system-on-a-chip.

FIG. 1 illustrates a system 100 comprising a host device 102 that can be used to configure secondary processors (SPs) on a system-on-a-chip (SoC) 114. The system 100 may be part of a computer server, which can be used to provide services such as analytics, cloud computing, deployment services, storage, databases, application development, or web services. The system 100 may also be part of another type of electronic device.

The host device 102 may comprise a host or a primary processor 104 coupled to a host memory 106. Although not shown here, the host device 102 may include additional hardware and software components to implement functionality supported by the system 100 based on the system specification, e.g., to communicate with a client computer for running client applications. The host device 102 may be configured to communicate with the SoC 114 via an interconnect 112. The interconnect 112 may include one or more of a bus, an interconnect fabric, a bridge, a multiplexer, a de-multiplexer, or another suitable interface based on the implementation. In some examples, the interconnect 112 may include a Peripheral Component Interconnect express (PCIe) interface, serial peripheral interface (SPI), or an inter-integrated circuit (I2C) interface.

In some examples, the SoC 114 can be configured as an acceleration engine, which can be used to accelerate certain operations or computations performed by the primary processor 104. For example, the acceleration engine can be used to accelerate operations related to machine learning, gaming, video processing, audio processing, or cryptography, among others. The SoC 114 may include any suitable number of SPs, although only SP1 116 and SP2 122 are shown in FIG. 1 for ease of discussion. The SoC 114 may include other components to implement the functionality of an acceleration engine, which is described in detail with reference to FIGS. 5, 6, and 7. The plurality of SPs can be configured to communicate with the host device 102 via a host interface 128. The host interface 128 may include a bus interface such as Advance Microcontroller Bus Architecture (AMBA) bus interface to communicate with the host device 102 via the interconnect 112. For example, the host interface 128 may support Advanced eXtensible Interface (AXI), Advanced Peripheral Bus (APB), or Advanced High-performance Bus (AHB) based on the implementation. In some cases, the primary processor 104, and the SP1 116 and/or the SP2 122 can be on the same die, while in other cases they can be on separate dies or packages.

The SP1 116 and the SP2 122 can be general-purpose or application-specific processors that can be used for a variety of tasks. The SP1 116 may be configured to execute a firmware1 120 stored in a memory1 118, and the SP2 122 may be configured to execute a firmware2 126 stored in a memory2 124. The memory1 118 and the memory2 124 can be DRAMs, SDRAMs, or other type of memory, which can be used to store data and/or instructions for the SP. The binary code for the firmware1 120 and the firmware2 126 may be generated by a compiler associated with the SP, and can be stored as compiled firmware 110 in the host memory 106. The primary processor 104 may be configured to load the compiled firmware 110 into the memory of each SP using the interconnect 112 and the host interface 128. In various examples, the compiler for the SP may also be stored in the host memory 106, or in a different memory on another device which can be accessed using an application programming interface (API) or another suitable interface.

In some examples, one or more SPs can be used to implement workarounds for hardware bugs or unexpected system behavior. For example, in some instances, the SoC 114 may be configured to wait for a certain signal to be asserted before performing an operation (e.g., advancing a state machine). However, in some cases, that signal may not be asserted in a timely manner, and therefore, the state machine may not advance. In some cases, a client application executing on the SoC 114 may be waiting for the state machine to advance; however, the state machine may not advance in the absence of the signal or may take too long to advance. This scenario may cause the client application to freeze or crash.

The host device 102 may rely on one or more SPs to provide a workaround for such foreseen or unforeseen events. In some implementations, a set of parameters can be used to assert certain signals, or adjust timing of certain signals to avoid a system hang when an unexpected behavior is detected. For example, the SPs may wait for specific amounts of time for various events to take place in the SoC 114 based on these parameters, when carrying out their assigned tasks. Generally, these parameters are pre-programmed in the software before the binary code or the firmware for the SPs is generated by the compiler.

The primary processor 104 may be configured to execute instructions stored in the host memory 106. The instructions stored in the host memory 106 may implement a configuration module 108, which can be used to configure the SoC 114 and possibly other components of the system 100. In some examples, the configuration module 108 may be executed as part of a boot process or an initialization sequence. For example, the configuration module 108 may be used to bring up different components of the SoC 114, setup various interfaces, clocks, etc.

In most cases, the firmware for the SPs may be loaded into the memory of the corresponding SPs during the boot process. Thus, the SPs may operate under the parameter values that are pre-programmed in the firmware. In some examples, the set of parameters may include a clock frequency parameter, which can be used by an SP to determine the runtime frequency of the SoC 114. However, in some cases, the runtime frequency of the SoC 114 may change based on the application being executed by the SoC 114, or due to other reasons (e.g., power saving mode). In some examples, the SP may utilize the runtime frequency to calculate the wall-clock time used to wait for specific amounts of time for various events to take place in the SoC 114.

In some cases, if the clock frequency parameter is hard-coded into the firmware, the firmware may need to be re-compiled when the clock frequency changes. However, in some cases, the source code may not be accessible for re-compiling the firmware on the fly. In some cases, at least some of the SPs in the SoC 114 may run at different clock frequencies, and therefore would need to be compiled with respective clock frequency parameters. Some systems may include additional addresses built into the hardware, which can be used to store the runtime clock frequencies; however, this additional hardware may need to be planned out ahead of time, and would limit configurability as the need for additional configuration parameters arise.

Some embodiments can allow the primary processor 104 to configure or re-configure the SPs by modifying certain parameters to be used by the SPs to perform various tasks. In certain embodiments, the set of parameters to be used by each SP can be stored in a pre-determined region in the memory of that SP, which can be easily accessed by the SP.

In some embodiments, the compiler for the SPs can be instructed to store each parameter at a corresponding predetermined address so that the parameters can be read from a known location. The primary processor 104 can be configured to access the compiled firmware 110, select an SP on the SoC 114, and modify one or more parameters at the corresponding pre-determined addresses in the compiled firmware 110 before loading the modified firmware into the memory of that SP. In some embodiments, the primary processor 104 can modify a parameter in the SP memory during runtime at an address (or a location) corresponding to the pre-determined address. For example, the primary processor 104 may determine the location of the parameter stored in the SP memory using a base address of the SP memory and the exported header from the compiler.

Certain embodiments can allow the host processor 104 to reload the firmware into the SP memory on as needed basis. In some cases, an SP on the SoC 114 may determine that an exception has occurred when performing a certain task, and communicate with the primary processor 104 to reset and reload the firmware into the SP memory. For example, the SP1 116 may send an interrupt to the interrupt controller of the host processor 104 requesting for a reset and reloading of the compiled firmware 110 into the memory1 118. The host processor 104 may perform a reset of the SP1 116, and reconfigure the parameters stored in the pre-determined location before loading the firmware1 120 into the memory1 118. In some embodiments, the host processor 104 may determine that the SP firmware needs to be reloaded due to a software change or a system error. In such cases, the host processor 104 may reconfigure the parameters in the compiled firmware 110 and reload the compiled firmware into the SP memory.

In some embodiments, the configuration module 108 may be used to access the compiled firmware for the SP, and modify the parameter(s) in the compiled firmware for each SP on the SoC 114. For example, the location of the stored parameters in the compiled firmware can be shared with the configuration module 108 using the exported headers from the compiler. The configuration module 108 may access the compiled firmware 110 in the host memory 106, and modify the parameters in the compiled firmware 110 based on the location to generate modified firmware1 120 before loading it into the memory1 118 of the SP1 116, and modified firmware2 126 before loading it into the memory2 124 of the SP2 122. In some implementations, one of the SPs can be configured to perform some of the functionality of the primary processor 104. For example, the SP1 116 can be used to configure the parameters of the SP2 122, or vice-versa.

The configuration module 108 may also be used to remodify a parameter stored in the memory1 118 of the SP1 116 upon determining that the parameter needs to be modified (e.g., during runtime). The configuration module 108 may determine an address of the parameter in the memory1 118 using the base address of the memory1 118 and the pre-determined address extracted from the exported headers (e.g., by adding the base address to the pre-determined address extracted from the exported headers). In some embodiments, a single binary file for an SP can be deployed to the system 100, which can be modified with different parameters for each of the SPs on the SoC 114. For example, the modified firmware1 120 may include a first set of parameter values and the modified firmware2 126 may include a second set of parameter values stored at the pre-determined addresses. This is further explained with reference to FIG. 2.

Figure 2:
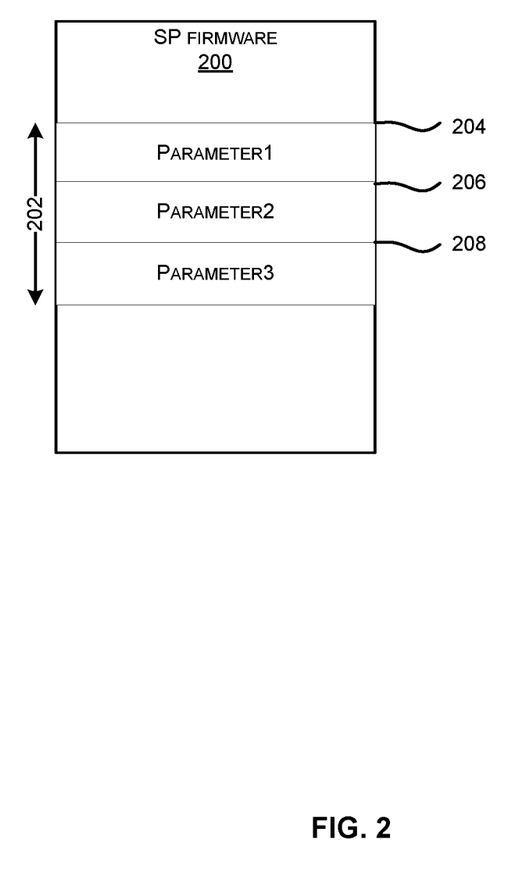
FIG. 2 illustrates a memory map for an SP firmware, according to certain embodiments.

FIG. 2 illustrates a memory map for an SP firmware 200 according to certain embodiments. The SP firmware 200 can be an example of the firmware1 120 or the firmware2 126 in FIG. 1.

In some examples, a region 202 can be used to store a set of parameters in the memory of the SP starting at an address 204 (e.g., 0x0). The set of parameters may include a parameter1, a parameter2, and a parameter3. For example, the parameter1, parameter2, and the parameter3 can be stored at the address 204, an address 206, and an address 208, respectively. As an example, the parameter1 can be a clock frequency parameter that can be used to specify a runtime clock frequency for the SP. The parameter2 can be used to specify delay times or iteration counts to wait for a specific event to occur before implementing a workaround. The delay times or iteration counts can have specific values based on the implementation. The parameter3 can be used to specify a unique identifier for each SP, which can be used as a label to differentiate one SP from another. For example, the unique identifiers can be used to execute different sections of the code assigned to each SP in the compiled firmware 110.

In some cases, when the same binary file is deployed to be used for all the SPs, the embodiments can allow programming different parameters for each SP. For example, the clock frequency parameter can be used to specify different runtime frequencies for the SP1 116 and the SP2 122. Similarly, the delay times or iteration counts can correspond to different events for each of the SPs. Additionally, the unique identifier for each SP can be used to differentiate code associated with that SP in the same firmware.

Figure 3:
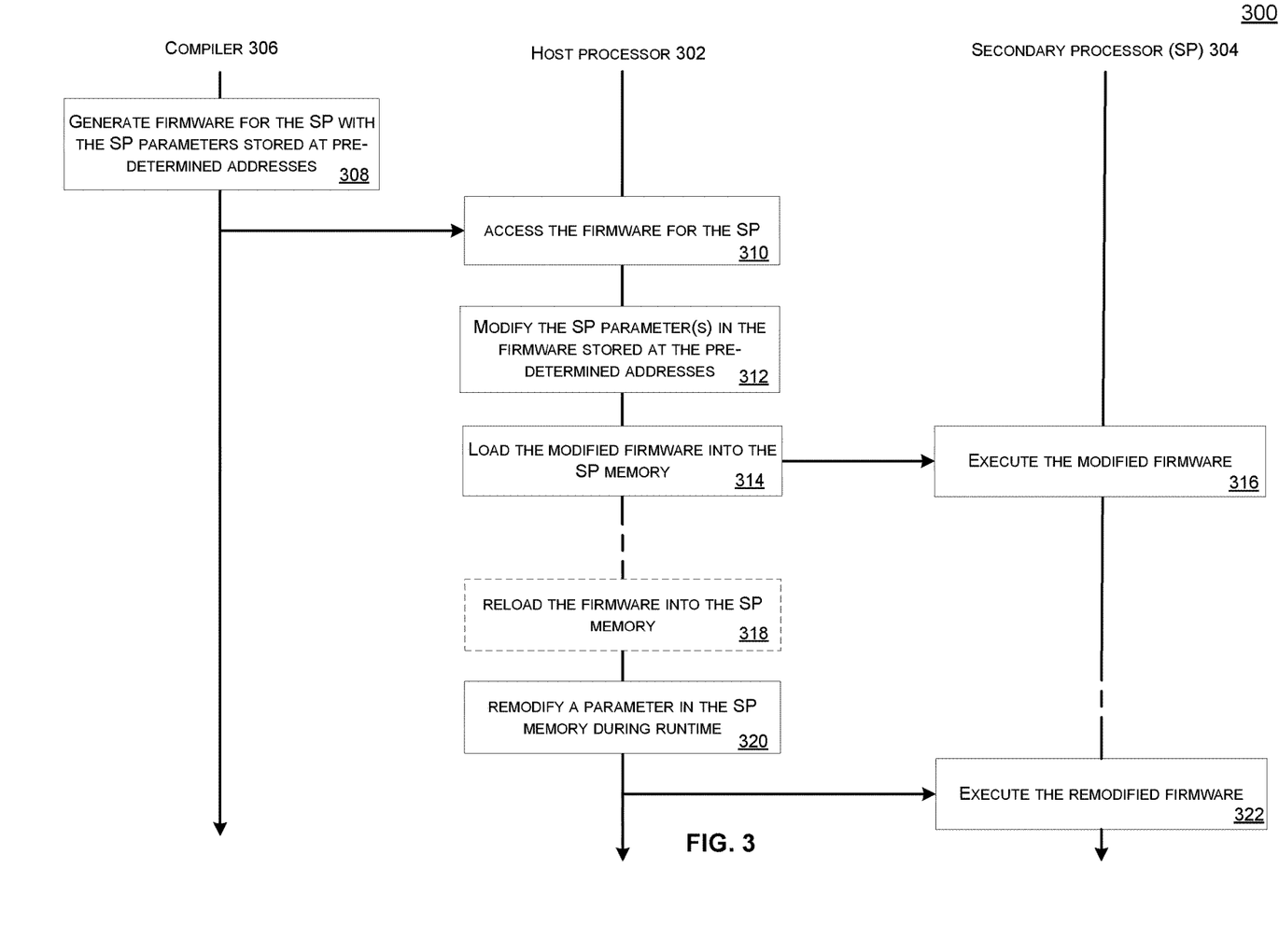
FIG. 3 illustrates a method to configure an SP by a host processor, according to certain embodiments.

FIG. 3 illustrates a method 300 to configure a SP 304 by a host processor 302, according to certain embodiments. As an example, the host processor 302 can be the primary processor 104, and the SP 304 can be one of the plurality of SPs on the SoC 114, e.g., the SP1 116 or the SP2 122. In some examples, the host processor 302 can be the SP1 116, and the SP 304 can be the SP2 122.

In step 308, a compiler 306 for the SP 304 can be configured to generate firmware for the SP 304 with the SP parameters stored at pre-determined addresses. In some examples, the code for the SP can be written in a programming language such as C++. The compiler 306 can be instructed to place the set of parameters (e.g., the parameter1, parameter2, and the parameter3) at a specific location in the firmware (e.g., starting at the address 204) when generating the compiled firmware 110 for the SP 304. In some embodiments, the address 204 can be communicated to the configuration module 108 via the exported headers from the compiler 306. In some embodiments, the configuration module 108 may be configured to instruct the compiler 306 to place the set of parameters at the pre-determined addresses (e.g., starting at the address 204), which can be used by the compiler 306 when generating the compiled firmware 110. In some examples, the parameter1 can be a clock frequency parameter used to specify a runtime clock frequency for the SP 304, the parameter2 can be a delay time parameter used to specify a delay time when waiting for an event to start, and the parameter3 can be used as a unique identifier for the SP 304.

In step 310, the host processor 302 can access the firmware for the SP 304 that was compiled using the compiler 306. As discussed with reference to the SP1 116 and the SP2 122 in FIG. 1, the primary processor 104 can access the compiled firmware 110 in the host memory 106. In some examples, the compiled firmware 110 may be stored on an external memory or device.

In step 312, the host processor 302 can modify one or more SP parameters stored at the pre-determined addresses in the firmware. The primary processor 104 can select the SP1 116 or the SP2 122 on the SoC 114 to modify the one or more parameters. As shown in FIG. 2, the primary processor 104 can modify the parameter1, parameter2, or parameter3 stored at the address 204, 206, and 208, respectively. In certain embodiments, the configuration module 108 can modify the one or more parameters stored at the corresponding addresses in the compiled firmware 110 to generate the modified firmware1 120 and the modified firmware2 126. In some examples, the configuration module 108 may modify the one or more parameters with different values for the SP1 116 and the SP2 122. For example, the clock frequency parameter can be different for the SP1 116 and the SP2 122. In some examples, the configuration module 108 may modify different parameters for the SP1 116 and the SP2 122. For example, the configuration module 108 may modify the clock frequency parameter for the SP1 116, and the delay time parameter for the SP2 122.

In step 314, the host processor 302 can load the modified firmware into the memory of the SP 304. The primary processor 104 can load the modified firmware1 120 into the memory1 118 of the SP1 116, and the modified firmware2 126 into the memory2 124 of the SP2 122. In some examples, modifying and loading the firmware can be part of the initialization and configuration of different components of the system 100 during the boot process.

In step 316, the SP 304 can execute the modified firmware. Referring back to FIG. 1, the SP1 116 can execute the modified firmware1 120, and the SP2 122 can execute the modified firmware2 126. For example, the SP1 116 can execute the modified firmware1 120 by reading the modified clock frequency parameter at a first address in the memory1 118 of the SP1 116 corresponding to the pre-determined address 204, and operating at a clock frequency specified by the modified clock frequency parameter. Similarly, the SP2 122 can execute the modified firmware2 126 by reading the modified delay time parameter at a second address in the memory2 124 of the SP2 122 corresponding to the pre-determined address 206, and using the modified delay time parameter when waiting for the event to start.

In step 318, the host processor 302 may reload the firmware into the SP memory. In some examples, the SP 304 may determine that an exception has occurred when performing a certain task, and send a message to the host processor 302 requesting a reset and reloading of the firmware. For example, the SP1 116 may send an interrupt to the interrupt controller of the host processor 104 requesting for a reset and reloading of the compiled firmware 110 into the memory1 118. The host processor 104 may perform a reset of the SP1 116, and reconfigure the parameters stored in the pre-determined region 202 before loading the firmware1 120 into the memory1 118. In some examples, the host processor 104 may reload the firmware into the SP memory for other reasons that are independent of the SPs. In some examples, the step 318 can be skipped when no reload is required.

In step 320, the host processor 302 may remodify a parameter in the SP memory during runtime. For example, the configuration module 108 may remodify the clock frequency parameter at the first address in the memory1 118, or remodify the delay time parameter at the second address in the memory2 124. In some embodiments, the primary processor 104 may determine that the clock frequency parameter is to be modified again, e.g., based on the change in the application being executed by the SP1 116 or when switching to a power saving mode. In some examples, the delay time parameter may need to be modified when there is a change in the runtime frequency.

In step 322, the SP 304 can execute the remodified firmware for the SP 304. For example, the SP1 116 can execute the remodified firmware1 120, and the SP2 120 can execute the remodified firmware2 126. For example, the SP1 116 can execute the remodified firmware1 120 by reading the modified clock frequency parameter at the first address in the memory1 118 of the SP1 116, and operate at the new clock frequency specified by the remodified clock frequency parameter. Similarly, the SP2 120 can execute the remodified firmware2 126 by reading the remodified delay time parameter at the second address in the memory2 124 of the SP2 122, and use the new delay time specified by the remodified delay time parameter when waiting for the event to occur.

Figure 4:
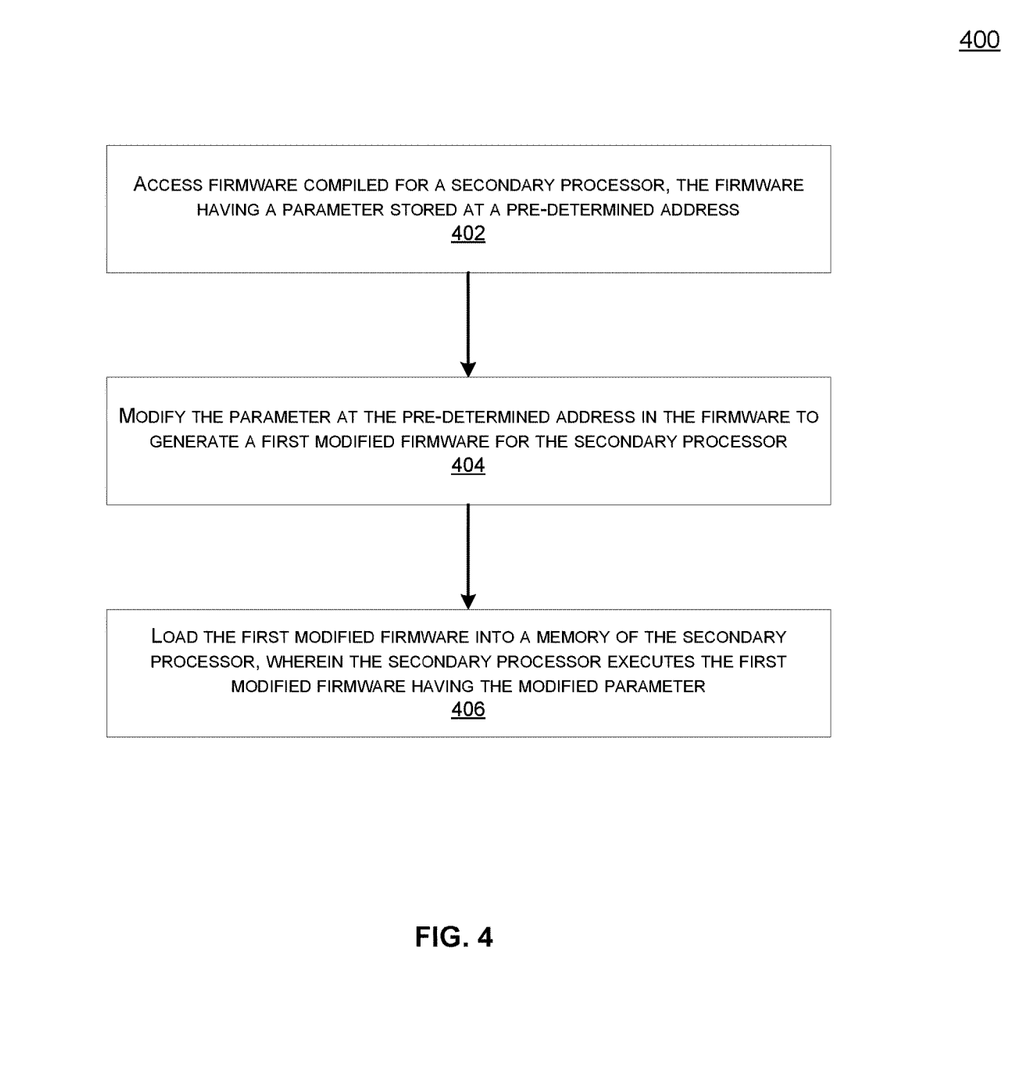
FIG. 4 illustrates a flowchart for a method performed by a primary processor to configure a secondary processor, according to certain embodiments.

FIG. 4 illustrates a flowchart 400 for a method performed by a primary processor to configure a secondary processor, according to certain embodiments. For example, the method may be performed by the primary processor 104 to configure any of the SPs on the SoC 114, e.g., the SP1 116 or the SP2 122.

In step 402, the primary processor may access firmware compiled for a secondary processor. The firmware may have a parameter stored at a pre-determined address. As an example, the parameter can be a clock frequency parameter. As discussed with reference to FIG. 1, the configuration module 108 may access the compiled firmware 110, which may be stored in the host memory 106. In some embodiments, the compiled firmware 110 may be stored on an external memory or device that may be accessible to the primary processor 104. As discussed previously, the compiler for the SPs can be instructed to store the parameter at a certain location when generating the compiled firmware 110, which can be shared with the configuration module 108 using the exported headers from the compiler. However, other methods of passing the location information to the primary processor 104 are possible.

In step 404, the primary processor may modify the parameter at the pre-determined address in the compiled firmware to generate a first modified firmware for the secondary processor. The configuration module 108 may modify the clock frequency parameter at the pre-determined address 204 in the compiled firmware 110 to generate the modified firmware1 120 for the SP1 116.

In step 406, the primary processor may load the first modified firmware into a memory of the secondary processor, and the secondary processor may execute the first modified firmware having the modified parameter. The configuration module 108 may load the modified firmware1 120 into the memory1 118 of the SP1 116 via the interconnect 112 and the host interface 128. In various examples, the configuration module 108 may load the modified firmware1 120 into the memory1 118 of the SP1 116 as part of the boot process or during runtime. In some instances, the configuration module 108 may remodify a parameter at an address in the memory1 118 of the SP1 116 corresponding to the pre-determined address. For example, in some cases, the clock frequency may change during runtime, and therefore, the firmware1 120 can be updated with the modified clock frequency parameter while the firmware1 120 is stored in the memory1 118 of the SP1 116 without having to recompile the firmware1 120. The configuration module 108 may determine the location of the clock frequency parameter in the memory1 118 using the base address of the memory1 118 and the exported headers from the compiler.

In some examples, the primary processor may determine that the compiled firmware 110 has to be reloaded. In such cases, the configuration module 108 may access the compiled firmware 110 again, reconfigure the set of parameters in the compiled firmware 110, and load the modified firmware in the SPs via the interconnect 112 and the host interface 128. In some examples, the primary processor can be one of the SPs on the SoC 114, e.g., the SP1 116, and the above described method may be performed by the SP1 116 to configure the SP2 122.

Thus, as discussed with reference to FIGS. 1-4, a single binary can be modified with different parameter values for different SPs. Various embodiments can be used to change the configuration of the SPs each time the firmware is loaded into the SP memory, or during runtime, without having to re-compile the firmware. The parameters can be stored in the SP memories without the need for any additional hardware to be implemented in the SP. The SPs can read the parameters from their memories just like other data stored in the memory.

Figure 5:
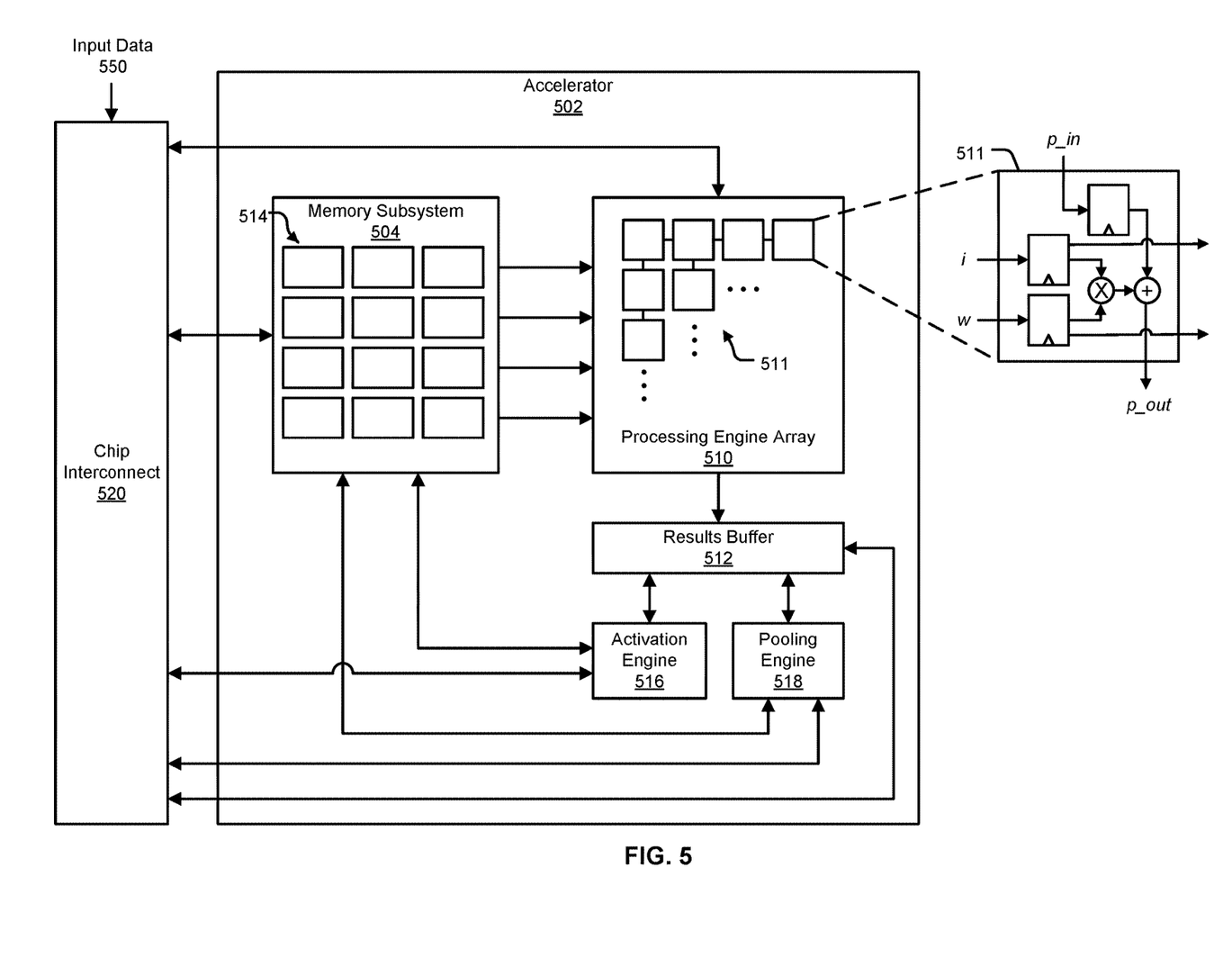
FIG. 5 is a block diagram illustrating an example of an integrated circuit device.

FIG. 5 is a block diagram illustrating an example of an integrated circuit device that can be part of the SoC 114 in FIG. 1. The example of FIG. 5 illustrates an accelerator 502. In various examples, the accelerator 502, for a set of input data (e.g., input data 550), can execute computations using a processing engine array 510, an activation engine 516, and/or a pooling engine 518. In some examples, the example accelerator 502 may be an integrated circuit component of a processor, such as a neural network processor. The processor may have other integrated circuit components, including additional accelerator engines.

In various implementations, the memory subsystem 504 can include multiple memory banks 514. In these implementations, each memory bank 514 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 514. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 504 can permit simultaneous access to the read or write channels of multiple memory banks. As another example, the memory subsystem 504 can include arbitration logic such that arbitration between, for example, the outputs of multiple memory banks 514 can result in more than one memory bank's output being used. In these and other examples, though globally managed by the memory subsystem 504, each memory bank can be operated independently of any other.

Having the memory banks 514 be independently accessible can increase the efficiency of the accelerator 502. For example, values can be simultaneously read and provided to each row of the processing engine array 510, so that the entire processing engine array 510 can be in use in one clock cycle. As another example, the memory banks 514 can be read at the same time that results computed by the processing engine array 510 are written to the memory subsystem 504. In contrast, a single memory may be able to service only one read or write at a time. With a single memory, multiple clock cycles can be required, for example, to read input data for each row of the processing engine array 510 before the processing engine array 510 can be started.

In various implementations, the memory subsystem 504 can be configured to simultaneously service multiple clients, including the processing engine array 510, the activation engine 516, the pooling engine 518, and any external clients that access the memory subsystem 504 over a communication fabric 520. In some implementations, being able to service multiple clients can mean that the memory subsystem 504 has at least as many memory banks as there are clients. In some cases, each row of the processing engine array 510 can count as a separate client. In some cases, each column of the processing engine array 510 can output a result, such that each column can count as a separate write client. In some cases, output from the processing engine array 510 can be written into the memory banks 514 that can then subsequently provide input data for the processing engine array 510. As another example, the activation engine 516 and the pooling engine 518 can include multiple execution channels, each of which can be separate memory clients. The memory banks 514 can be implemented, for example, using static random access memory (SRAM).

In various implementations, the memory subsystem 504 can include control logic. The control logic can, for example, keep track of the address spaces of each of the memory banks 514, identify memory banks 514 to read from or write to, and/or move data between the memory banks 514. In some implementations, memory banks 514 can be hardwired to particular clients. For example, a set of memory banks 514 can be hardwired to provide values to the rows of the processing engine array 510, with one memory bank servicing each row. As another example, a set of memory banks can be hard wired to receive values from columns of the processing engine array 510, with one memory bank receiving data for each column.

The processing engine array 510 is the computation matrix of the example accelerator 502. The processing engine array 510 can, for example, execute parallel integration, convolution, correlation, and/or matrix multiplication, among other things. The processing engine array 510 includes multiple processing engines 511, arranged in rows and columns, such that results output by one processing engine 511 can be input directly into another processing engine 511. Processing engines 511 that are not on the outside edges of the processing engine array 510 thus can receive data to operate on from other processing engines 511, rather than from the memory subsystem 504.

In various examples, the processing engine array 510 uses systolic execution, in which data arrives at each processing engine 511 from different directions at regular intervals. In some examples, input data can flow into the processing engine array 510 from the left and weight values can be loaded at the top. In some examples weights and input data can flow from the left and partial sums can flow from top to bottom. In these and other examples, a multiply-and-accumulate operation moves through the processing engine array 510 as a diagonal wave front, with data moving to the right and down across the array. Control signals can be input at the left at the same time as weights, and can flow across and down along with the computation.

In various implementations, the number of columns in the processing engine array 510 determines the computational capacity of the processing engine array 510, and the number of rows determines the required memory bandwidth for achieving maximum utilization of the processing engine array 510. The processing engine array 510 can have, for example, 64 columns and 428 rows, or some other number of columns and rows.

An example of a processing engine 511 is illustrated in FIG. 5 in an inset diagram. As illustrated by this example, a processing engine 511 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 511.

In the illustrated example, an input from above can include a partial sum, p_in, provided either from another processing engine 511 or from a previous round of computation by the processing engine array 510. When starting a computation for a new set of input data, the top row of the processing engine array 510 can receive a fixed value for p_in, such as zero. As illustrated by this example, i and w are multiplied together and the result is summed with p_in to produce a new partial sum, p_out, which can be input into another processing engine 511. Various other implementations of the processing engine 511 are possible.

Outputs from the last row in the processing engine array 510 can be temporarily stored in the results buffer 512. The results can be intermediate results, which can be written to the memory banks 514 to be provided to the processing engine array 510 for additional computation. Alternatively, the results can be final results, which, once written to the memory banks 514 can be read from the memory subsystem 504 over the communication fabric 520, to be output by the system.

In some implementations, the accelerator 502 includes an activation engine 516. In these implementations, the activation engine 516 can combine the results from the processing engine array 510 into one or more output activations. For example, for a convolutional neural network, convolutions from multiple channels can be summed to produce an output activation for a single channel. In other examples, accumulating results from one or more columns in the processing engine array 510 may be needed to produce an output activation for a single node in the neural network. In some examples, activation engine 516 can be bypassed.

In various examples, the activation engine 516 can include multiple separate execution channels. In these examples, the execution channels can correspond to the columns of the processing engine array 510, and can perform an operation on the outputs of a column, the result of which can be stored in the memory subsystem 504. In these examples, the activation engine 516 may be able to perform between 1 and n parallel computations, where n is equal to the number of columns in the processing engine array 510. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 502 can include a pooling engine 518. Pooling is the combining of outputs of the columns of the processing engine array 510. Combining can include for example, computing a maximum value, a minimum value, an average value, a median value, a summation, a multiplication, or another logical or mathematical combination. In various examples, the pooling engine 518 can include multiple execution channels that can operating on values from corresponding columns of the processing engine array 510. In these examples, the pooling engine 518 may be able to perform between 1 and n parallel computations, where n is equal to the number of columns in the processing engine array 510. In various examples, execution channels of the pooling engine 518 can operate in parallel and/or simultaneously. In some examples, the pooling engine 518 can be bypassed.

Herein, the activation engine 516 and the pooling engine 518 may be referred to collectively as execution engines. The processing engine array 510 is another example of an execution engine. Another example of an execution engine is a Direct Memory Access (DMA) engine, which may be located outside the accelerator 502.

Input data 550 can arrive over the communication fabric 520. The communication fabric 520 can connect the accelerator 502 to other components of a processor, such as a DMA engine that can obtain input data 550 from an Input/Output (I/O) device, a storage drive, or a network interface. The input data 550 can be, for example one-dimensional data, such as a character string or numerical sequence, or two-dimensional data, such as an array of pixel values for an image or frequency and amplitude values over time for an audio signal. In some examples, the input data 550 can be three-dimensional, as may be the case with, for example, the situational information used by a self-driving car or virtual reality data. In some implementations, the memory subsystem 504 can include a separate buffer for the input data 550. In some implementations, the input data 550 can be stored in the memory banks 514 when the accelerator 502 receives the input data 550.

In some examples, the accelerator 502 can implement a neural network processing engine. In these examples, the accelerator 502, for a set of input data 550, can execute a neural network to perform a task for which the neural network was trained. Executing a neural network on a set of input data can be referred to as inference or performing inference.

The weights for the neural network can be stored in the memory subsystem 504, along with input data 550 on which the neural network will operate. The neural network can also include instructions, which can program the processing engine array 510 to perform various computations on the weights and the input data. The instructions can also be stored in the memory subsystem 504, in the memory banks 514 or in a separate instruction buffer. The processing engine array 510 can output intermediate results, which represent the outputs of individual layers of the neural network. In some cases, the activation engine 516 and/or pooling engine 518 may be enabled for computations called for by certain layers of the neural network. The accelerator 502 can store the intermediate results in the memory subsystem 504 for inputting into the processing engine array 510 to compute results for the next layer of the neural network. The processing engine array 510 can further output final results from a last layer of the neural network. The final results can be stored in the memory subsystem 504 and then be copied out to host processor memory or to another location.

Figure 6:
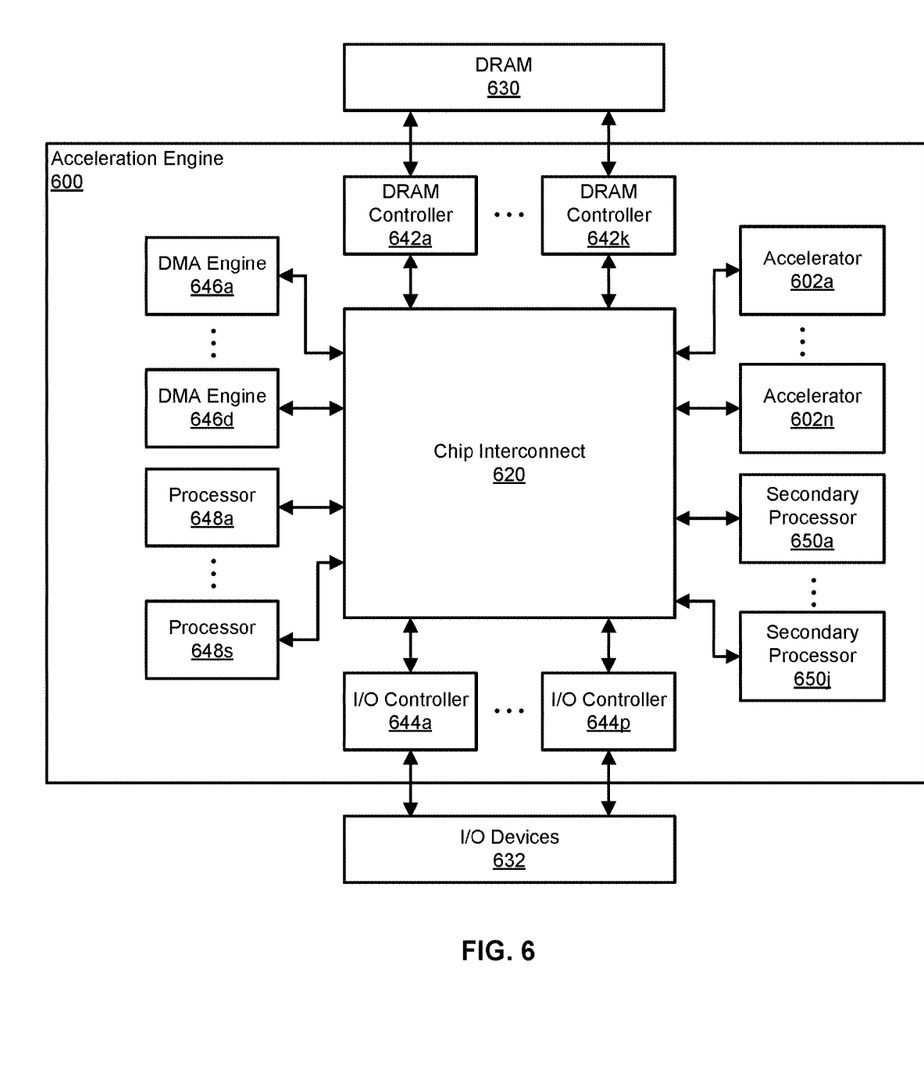
FIG. 6 includes a block diagram that illustrates an example of an acceleration engine.

FIG. 6 includes a block diagram that illustrates an example of an acceleration engine 600. The acceleration engine 600 is an example of an integrated circuit that can include one or more accelerators 602a-602n that may be similar to the accelerator 502 illustrated in FIG. 5.

In the example of FIG. 6, the acceleration engine 600 includes multiple accelerators 602a-602n, each of which can perform a set of operations. In various examples, the accelerators 602a-602n are for particular types of operations, so that the accelerators 602a-602n can perform the operations much faster than when similar operations are performed by a general purpose processor. In various examples, to perform a set of operations, input data on which the operations are to be performed must first be moved into the accelerators 602a-602n. Additionally, in some cases, program code is also moved into the accelerators 602a-602n, which programs the operations that the accelerators 602a-602n will perform on the data. In the illustrated example, the acceleration engine 600 includes n accelerators 602a-602n. Examples of accelerators that can be included in the acceleration engine 600 include graphics accelerators, floating point accelerators, neural network accelerators, and others. In various examples, the accelerators 602a-602n can each be the same (e.g., each of the accelerators 602a-602n is a graphics accelerator) or can be different (e.g., the accelerators 602a-602n include a graphics accelerator, a floating point accelerator, and neural network accelerator).

The example acceleration engine 600 further includes DRAM controllers 642a-642k for communicating with an external memory. The external memory is implemented, in this example, using DRAM 630. In the illustrated example, the acceleration engine 600 includes k DRAM controllers 642a-642k, each of which may be able to communicate with an independent set of banks of DRAM. In other examples, other types of RAM technology can be used for the external memory. The DRAM controllers 642a-642k can also be referred to as memory controllers.

In various examples, input data and/or program code for the accelerators 602a-602n can be stored in the DRAM 630. Different programs can cause the accelerators 602a-602n to perform different operations. For example, when one of the accelerators is a neural network accelerator, one program can configure the neural network accelerator to perform speech recognition while another program can configure the neural network accelerator to perform image recognition. In various examples, different accelerators 602a-602n can be programmed with different programs, so that each performs a different set of operations. In various examples, the processors 648a-648s can manage moving of program code from the DRAM 630 to the accelerators 602a-602n.

The example acceleration engine 600 further includes I/O controllers 644a-644p for communicating with I/O devices 632 in the system. The acceleration engine 600 can communicate with I/O devices over, for example, a processor bus. In some examples, the processor bus can be implemented using Peripheral Component Interconnect (PCI) and/or a variation of the PCI bus protocol. The processor bus can connect the acceleration engine 600 to I/O devices such as, for example, input and output devices, memory controllers, storage devices, and/or network interface cards, among other things. In some examples, the I/O controllers 644-644p can enable the acceleration engine 600 to act as an I/O device for a host processor. For example, the acceleration engine 600 can be the recipient of input data from the host processor, and a command indicating an operation to be performed on the input data (e.g., a particular computation or analysis). In the illustrated example, the acceleration engine 600 includes p I/O controllers 644a-644p, each of which may include a separate root complex and may communicate with a separate set of I/O devices 632. In other examples, other standardized bus protocols, such as Ultra Path Interconnect (UPI) can be used for the host bus. In other examples, a proprietary bus protocol can be used.

Movement of data in the acceleration engine 600 can be managed by one or more processors 648a-648s, which can also be referred to as data management processors. In the example of FIG. 6, the acceleration engine 600 includes s processors 648a-648s incorporated into the device (e.g., on the same silicon die). In other examples, the processors 648a-648s can be external to the acceleration engine 600 (e.g., on a different die and/or in a different package). In some examples, the processors 648a-648s can manage the movement of data from I/O devices 632 to the accelerators 602a-602n or the DRAM 630. For example, input data may be located at an I/O device 632 or in processor memory, and the processors 648a-648s can move the input from the I/O device 632 or processor memory into an accelerator or into DRAM 630. As another example, program code for the accelerators 602a-602n may be located on an I/O device 632 or in processor memory.

The example acceleration engine 600 further includes DMA engines 646a-646d that can move data between the accelerators 602a-602n, DRAM controllers 642a-642k, and I/O controllers 644a-644p. In the illustrated example, the acceleration engine 600 includes d DMA engines 646a-646d. In some implementations, the DMA engines 646a-646d can be assigned to specific tasks, such as moving data from the DRAM controllers 642a-642d to the accelerators 602a-602n, or moving data between the I/O controllers 644a-644p and the accelerators 602a-602n. These tasks can be assigned, for example, by enqueuing descriptors with the DMA engines 646a-646d, where a descriptor identifies an address for a block of data and an operation (e.g., a read or a write) to perform. A descriptor, for example, can direct a DMA engine to instruct a DMA controller to read a block of data from DRAM 630. A descriptor can, as a further example, instruct the DMA engine to write data, read by the DMA controller, to an accelerator. Further descriptors can be used to move data from an accelerator to DRAM 630.

In various examples, each of the processors 648a-648s can be responsible for managing the data movement for a different accelerator. In some examples, a processor may manage the data movement for more than one accelerator. Similarly, in various examples, each of the processors 648a-648s can be assigned to one or more DMA engines 646a-646d. In these and other examples, associations between processors 648a-648s, accelerators 602a-602n, and DMA engines 646a-646d are determined by program code being executed by each respective processor.

In some examples, the acceleration engine 600 may further include SPs 650a-650j, which can be used to perform various tasks. The SPs 650a-650j may be an example of the plurality of SPs on the SoC 114 in FIG. 1. For example, the SPs 650a-650j may include the SP1 116 and the SP2 122. In some examples, functionality of the SPs 650a-650j can be performed by the processors 648a-648s, and the SPs 650a-650j can be eliminated.

In the example acceleration engine 600, the various components can communicate over a chip interconnect 620. The chip interconnect 620 primarily includes wiring for routing data between the components of the acceleration engine 600. In some cases, the chip interconnect 620 can include a minimal amount of logic, such as multiplexors to control the direction of data, flip-flops for handling clock domain crossings, and timing logic.

Figure 7:
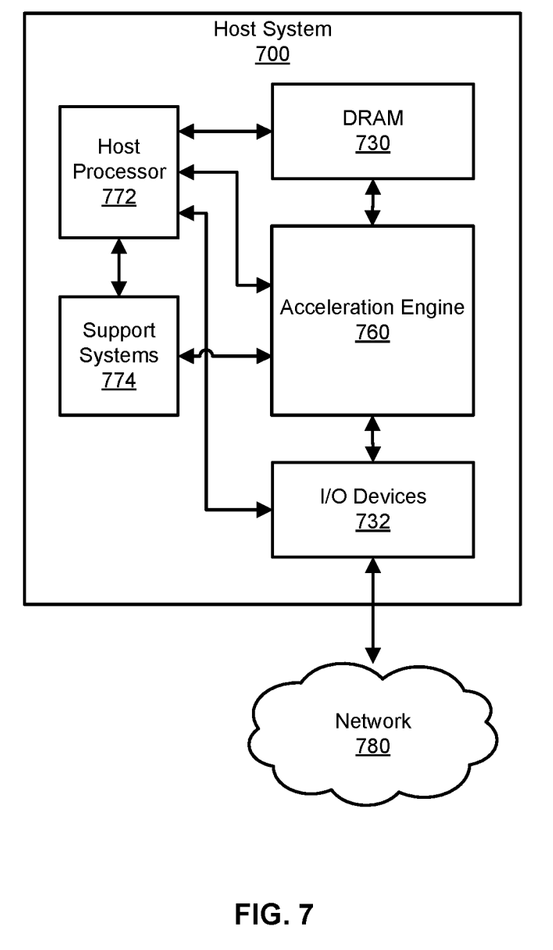
FIG. 7 includes a block diagram that illustrates an example of a host system.

FIG. 7 includes a block diagram that illustrates an example of a host system 700 in which an acceleration engine 760 can be used. The acceleration engine 760 of FIG. 7 is an example of a device that can include one or more accelerators such as is illustrated in FIG. 6. The example host system 700 of FIG. 7 includes the acceleration engine 760, a host processor 772, DRAM 730 or processor memory, I/O devices 732, and support systems 774. In various implementations, the host system 700 can include other hardware that is not illustrated here. In some examples, the system 100 of FIG. 1 can be part of the host system 700.

The host processor 772 is a general purpose integrated circuit that is capable of executing program instructions. In some examples, the host processor 772 can include multiple processing cores. A multi-core processor may include multiple processing units within the same processor. In some examples, the host system 700 can include more than one host processor 772. In some examples, the host processor 772 and the acceleration engine 760 can be one chip, such as, one or more integrated circuits within the same package.

In various examples, the host processor 772 can communicate with other components in the host system 700 over one or more communication channels. For example, the host system 700 can include a host processor bus, which the host processor 772 can use to communicate with the DRAM 730, for example. As another example, the host system 700 can include an I/O bus, such as a PCI-based bus, over which the host processor 772 can communicate with the acceleration engine 760 and/or the I/O devices 732, for example. In various examples, the host system 700 can, alternatively or additionally, include other communication channels or busses, such as serial busses, power management busses, storage device busses, and so on. In some examples, the host processor 772 may be configured to perform the functionality of the host processor 104 in FIG. 1, and the SoC 114 may be part of the acceleration engine 760.

In some examples, software programs executing on the host processor 772 can receive or generate input for processing by the acceleration engine 760. In some examples, the programs can select an appropriate neural network to execute for a given input. For example, a program may be for language translation, and can select one or more neural networks capable of speech recognition and/or machine translation. In these and other examples, the programs can configure the acceleration engine 760 with the neural network to execute, and/or can select a neural network processing engine on the acceleration engine 760 that has previously been configured to execute the desired neural network. In some examples, once the acceleration engine 760 has started an inference on input data, the host processor 772 can manage the movement of data (such as weights, instructions, intermediate results, results of conditional layers, and/or final results) into or out of the acceleration engine 760.

In some examples, a software program that is using the acceleration engine 760 to conduct an inference can read the result from a conditional layer from the acceleration engine 760 and/or from a storage location, such as in DRAM 730. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 730 is memory that is used by the host processor 772 for storage of program code that the host processor 772 is in the process of executing, as well as values that are being operated on. In some examples, the data for a neural network (e.g., weight values, instructions, and other data) can be all or partially stored in the DRAM 730. DRAM is a common term for processor memory, and though DRAM is volatile memory, processor memory can be volatile and/or non-volatile. Though not illustrated here, the host system 700 can include other volatile and non-volatile memories for other purposes. For example, the host system 700 can include a Read-Only Memory (ROM) that stores boot code for booting the host system 700 at power on, and/or Basic Input/Output System (BIOS) code.

Though not illustrated here, the DRAM 730 can store instructions for various programs, which can be loaded into and be executed by the host processor 772. For example, the DRAM 730 can be storing instructions for an operating system, one or more data stores, one or more application programs, one or more drivers, and/or services for implementing the features disclosed herein.

The operating system can manage and orchestrate the overall operation of the host system 700, such as scheduling tasks, executing applications, and/or controller peripheral devices, among other operations. In some examples, a host system 700 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 700. For example, some drivers can provide communication between the operating system and peripheral devices or I/O devices 732. Alternatively or additionally, some drivers may provide communication between application programs and the operating system, and/or application programs and peripheral devices accessible to the host system 700. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 732 can include hardware for connecting to user input and output devices, such as keyboards, mice, pens, tablets, voice input devices, touch input devices, displays or monitors, speakers, and printers, among other devices. The I/O devices 732 can also include storage drives and/or network interfaces for connecting to a network 780. For example, the host system 700 can use a network interface to communicate with storage devices, user terminals, other computing devices or servers, and/or other networks, among various examples.

In various examples, one or more of the I/O devices 732 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 700 or may be in an external enclosure. A storage device can be fixed (e.g., attached by screws) or removable (e.g., having a physical release mechanism and possibly a hot-plug mechanism).

Storage devices, the DRAM 730, and any other memory component in the host system 700 are examples of computer-readable storage media. Computer-readable storage media are physical mediums that are capable of storing data in a format that can be read by a device such as the host processor 772. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 732 can be PCI-based devices. In these examples, a PCI-based I/O device includes a PCI interface for communicating with the host system 700. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 774 can include hardware for coordinating the operations of the acceleration engine 760. For example, the support systems 774 can include a microprocessor that coordinates the activities of the acceleration engine 760, including moving data around on the acceleration engine 760. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 772. In some examples, the program executed by the microprocessor is stored on the hardware of microprocessor, or on a non-volatile memory chip in the host system 700. In some examples, the microprocessor and the acceleration engine 760 can be on chip, such as one integrated circuit on the same die and in the same package.

In some examples, the support systems 774 can be responsible for taking instructions from the host processor 772 when programs executing on the host processor 772 request the execution of a neural network. For example, the host processor 772 can provide the support systems 774 with a set of input data and a task that is to be performed on the set of input data. In this example, the support systems 774 can identify a neural network that can perform the task, and can program the acceleration engine 760 to execute the neural network on the set of input data. In some examples, the support systems 774 only needs to select an appropriate neural network processing engine of the neural network processor. In some examples, the support systems 774 may need to load the data for the neural network onto the acceleration engine 760 before the acceleration engine 760 can start executing the neural network. In these and other examples, the support systems 774 can further receive the output of executing the neural network, and provide the output back to the host processor 772. In some examples, the support system 774 may be responsible for communicating with a compiler for the SPs to obtain the compiled firmware 110 and store it into the DRAM 730 or another memory in the host system 700, which is accessible to the host processor 772. In other examples, the support system 774 may include the compiler for the SPs.

In some implementations, the compiler for the SP may perform operations including receiving firmware source code for the SP for compilation, and linking a parameter in the firmware software code with a pre-determined address. For example, the compiler may receive firmware source code (e.g., C++ code) for the SPs on the SoC 114, and link a parameter (e.g., the parameter1, parameter2, or the parameters3) with a corresponding pre-determined address 204, 206, or 208. The operations performed by the compiler may also include generating, from the firmware source code, compiled code to be loaded into a memory of the SP, and exporting a header comprising the pre-determined address corresponding to the parameter to a host processor coupled to the SP. For example, the compiler may generate the compiled firmware 110 for the SP1 118 and/or the SP2 122 and export the header comprising the pre-determined address 204, 206, or 208 to the configuration module 108 in the host processor 772.

In some examples, the operations of the support systems 774 can be handled by the host processor 772. In these examples, the support systems 774 may not be needed and can be omitted from the host system 700.

In various examples, the host system 700 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 700 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
   a host processor; and
   a system-on-a-chip (SoC) comprising a plurality of secondary processors,
   wherein the host processor is configured to:
      access firmware compiled for the plurality of secondary processors, the firmware having a clock frequency parameter stored at a pre-determined address;
      select a first secondary processor from the plurality of secondary processors;
      modify the clock frequency parameter at the pre-determined address in the firmware to generate a first modified firmware for the first secondary processor; and
      load the first modified firmware into a memory of the first secondary processor, and
   wherein the first secondary processor is configured to:
      execute the first modified firmware by reading the modified clock frequency parameter at an address in the memory of the first secondary processor corresponding to the pre-determined address, and operating at a first clock frequency specified by the modified clock frequency parameter.

2. The system of claim 1, wherein the host processor is further configured to:
   determine that the clock frequency parameter is to be modified again; and
   remodify the clock frequency parameter in the memory of the first secondary processor during runtime.

3. The system of claim 2, wherein the host processor is further configured to:
   determine that the first secondary processor is to be re-configured during runtime;
   remodify the clock frequency parameter at the pre-determined address in the firmware to generate a second modified firmware for the first secondary processor; and
   load the second modified firmware into the memory of the first secondary processor, and
   wherein the first secondary processor is further configured to:
      execute the second modified firmware by reading the remodified clock frequency parameter at the address in the memory of the first secondary processor corresponding to the pre-determined address, and operating at a second clock frequency specified by the remodified clock frequency parameter.

4. The system of claim 1, wherein the host processor is further configured to:
   select a second secondary processor from the plurality of secondary processors;
   modify the clock frequency parameter in the firmware to generate a second modified firmware for the second secondary processor; and
   load the second modified firmware into a memory of the second secondary processor, and
   wherein the second secondary processor is configured to:
      execute the second modified firmware by reading the modified clock frequency parameter from the memory of the second secondary processor, and operating at a second clock frequency specified by the modified clock frequency parameter.

5. A computer-implemented method, comprising, by a primary processor:
   accessing firmware compiled for a secondary processor, the firmware having a parameter stored at a pre-determined address;
   modifying the parameter at the pre-determined address in the firmware to generate a first modified firmware for the secondary processor; and
   loading the first modified firmware into a memory of the secondary processor, wherein the secondary processor executes the first modified firmware having the modified parameter.

6. The computer-implemented method of claim 5, wherein the primary processor accesses the firmware for the secondary processor as part of a boot process.

7. The computer-implemented method of claim 5, further comprising:
   determining that the parameter is to be modified during runtime; and
   remodifying the parameter at an address in the memory of the secondary processor corresponding to the pre-determined address.

8. The computer-implemented method of claim 7, wherein the secondary processor executes the first modified firmware having the remodified parameter without having to re-compile the firmware for the secondary processor.

9. The computer-implemented method of claim 5, wherein the pre-determined address is in a region in the memory that is configured to store data or instructions for the secondary processor.

10. The computer-implemented method of claim 5, further comprising:
    determining that the parameter is to be modified again during runtime;
    remodifying the parameter at the pre-determined address in the firmware to generate a second modified firmware for the secondary processor; and
    loading the second modified firmware into the memory of the secondary processor, wherein the secondary processor executes the second modified firmware having the remodified parameter.

11. The computer-implemented method of claim 5, wherein the primary processor is a host processor of a host system, and the secondary processor is part of a system-on-a-chip (SoC) having a plurality of secondary processors.

12. The computer-implemented method of claim 11, further comprising:

modifying the parameter at the pre-determined address in the firmware to generate a second modified firmware for another secondary processor in the plurality of secondary processors; and loading the second modified firmware into a memory of the other secondary processor, wherein the other secondary processor executes the second modified firmware having the modified parameter.

13. The computer-implemented method of claim 12, wherein the modified parameter in the first modified firmware has a different value than the modified parameter in the second modified firmware.

14. The computer-implemented method of claim 11, wherein the SoC is configured as an acceleration engine for a neural network.

15. The computer-implemented method of claim 5, wherein the parameter is used to specify a runtime clock frequency for the secondary processor.

16. The computer-implemented method of claim 5, wherein the parameter is part of a set of parameters stored in a pre-determined address region in the firmware, the set of parameters used for configuration of the secondary processor.

17. A non-transitory computer readable medium having stored therein instructions that, when executed by a primary processor, cause the primary processor to perform a method comprising:

accessing firmware compiled for a secondary processor, the firmware having a parameter stored at a pre-determined address;

modifying the parameter at the pre-determined address in the firmware to generate a first modified firmware for the secondary processor; and loading the first modified firmware into a memory of the secondary processor, wherein the secondary processor executes the first modified firmware having the modified parameter.

18. The non-transitory computer readable medium of claim 17, further comprising:

determining that the parameter is to be modified during runtime; and remodifying the parameter at an address in the memory of the secondary processor corresponding to the pre-determined address.

19. The non-transitory computer readable medium of claim 17, further comprising:

determining that the parameter is to be modified again during runtime;

remodifying the parameter at the pre-determined address in the firmware to generate a second modified firmware for the secondary processor; and loading the second modified firmware into the memory of the secondary processor, wherein the secondary processor executes the second modified firmware having the remodified parameter.

20. The non-transitory computer readable medium of claim 17, wherein the primary processor is a host processor of a host system, and the secondary processor is part of a system-on-a-chip (SoC) having a plurality of secondary processors, the method further comprising:

modifying the parameter at the pre-determined address in the firmware to generate a second modified firmware for another secondary processor in the plurality of secondary processors; and loading the second modified firmware into a memory of the other secondary processor, wherein the other secondary processor executes the second modified firmware having the modified parameter.

21. A non-transitory computer readable medium having stored therein program code that, when executed by one or more processors, causes the one or more processors to execute a compiler, the compiler performing operations including:

receiving firmware source code for a secondary processor (SP) for compilation;

linking a parameter in the firmware source code with a pre-determined address;

generating, from the firmware source code, compiled code to be loaded into a memory of the SP; and exporting a header comprising the pre-determined address corresponding to the parameter to a host processor, wherein the host processor is configured to modify the parameter at the pre-determined address in the compiled code based on the exported header before loading the compiled coded into the memory of the SP.

22. The non-transitory computer readable medium of claim 21, wherein the host processor is further configured to determine, based on the exported header and a base address of the memory of the SP, an address of the parameter stored in the memory of the SP.

* * * * *